(12) United States Patent
Lin et al.

(10) Patent No.: US 9,799,107 B2
(45) Date of Patent: Oct. 24, 2017

(54) IMAGE BRIGHTNESS ADJUSTING METHOD, OBJECT TRACKING METHOD AND OBJECT TRACKING APPARATUS

(71) Applicant: PixArt Imaging Inc., Hsin-Chu (TW)

(72) Inventors: Yu-Chia Lin, Hsin-Chu (TW);
Yu-Hsiang Huang, Hsin-Chu (TW);
Chih-Hsin Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 523 days.

(21) Appl. No.: 14/300,192

(22) Filed: Jun. 9, 2014

(65) Prior Publication Data

US 2015/0170344 A1    Jun. 18, 2015

(30) Foreign Application Priority Data

Dec. 18, 2013   (TW) .............................. 102146978 A (51) Int. Cl.
| | |
|---|---|
| G06T 5/00 | (2006.01) |
| G01S 5/16 | (2006.01) |
| H04N 5/232 | (2006.01) |
| G06F 3/041 | (2006.01) |
| G06F 3/042 | (2006.01) |
| H04N 5/235 | (2006.01) |
| H04N 5/243 | (2006.01) |

(52) U.S. Cl.
CPC ............... *G06T 5/007* (2013.01); *G01S 5/16* (2013.01); *G06F 3/042* (2013.01); *G06F 3/0418* (2013.01); *H04N 5/2351* (2013.01); *H04N 5/23216* (2013.01); *H04N 5/243* (2013.01)

(58) Field of Classification Search
CPC ...... G06T 5/007; H04N 5/243; H04N 5/2351; H04N 5/23216; G06F 3/0418; G06F 3/042; G01S 5/16; G06K 9/00
See application file for complete search history.

(56) References Cited

U.S. PATENT DOCUMENTS

| | | | | |
|---|---|---|---|---|
| 6,434,254 | B1 * | 8/2002 | Wixson | .............. G06K 9/00785 348/122 |
| 7,663,689 | B2 * | 2/2010 | Marks | ..................... H04N 5/272 348/370 |
| 7,925,152 | B2 * | 4/2011 | Lien | ....................... G03B 7/093 348/364 |
| 7,974,467 | B2 * | 7/2011 | Kaku | ................... H04N 1/3878 382/167 |
| 8,749,527 | B2 | 6/2014 | Douxchamps | |

(Continued)

FOREIGN PATENT DOCUMENTS

| | | |
|---|---|---|
| CN | 102314258 A | 1/2012 |
| CN | 102422250 A | 4/2012 |

(Continued)

*Primary Examiner* — Sath V Perungavoor
*Assistant Examiner* — Howard D Brown, Jr.
(74) *Attorney, Agent, or Firm* — Winston Hsu (57) ABSTRACT

An image brightness information adjusting method, which comprises: computing background brightness information of an image; computing a first brightness information difference between brightness information for at least one pixel of a first image line of the image and background brightness information corresponding to the first image line; and adjusting brightness information for at least one pixel of a second image line according to the first brightness information difference.

35 Claims, 6 Drawing Sheets

(56) References Cited

U.S. PATENT DOCUMENTS

| | | | | |
|---|---|---|---|---|
| 2005/0271379 A1* | 12/2005 | Lee | ............... | H04N 5/2351 |
| | | | | 396/234 |
| 2008/0013799 A1* | 1/2008 | Steinberg | ........... | G06K 9/00228 |
| | | | | 382/118 |
| 2009/0060379 A1* | 3/2009 | Manabe | ............... | H04N 5/2351 |
| | | | | 382/274 |
| 2011/0306304 A1* | 12/2011 | Forutanpour | ....... | G06F 3/04883 |
| | | | | 455/67.11 |
| 2012/0075253 A1* | 3/2012 | Tsai | ............... | G06F 3/042 |
| | | | | 345/175 |
| 2012/0154659 A1* | 6/2012 | Wang | ............... | H04N 9/3194 |
| | | | | 348/333.1 |
| 2012/0219218 A1* | 8/2012 | Demandolx | ............... | G06T 5/40 |
| | | | | 382/168 |
| 2013/0063628 A1* | 3/2013 | Kubota | ............... | H04N 5/217 |
| | | | | 348/241 |
| 2013/0128080 A1* | 5/2013 | Hsu | ............... | H04N 5/2351 |
| | | | | 348/234 |
| 2013/0208068 A1* | 8/2013 | Furuta | ............... | G03G 15/04054 |
| | | | | 347/118 |
| 2013/0314433 A1* | 11/2013 | Ko | ............... | G09G 3/20 |
| | | | | 345/592 |

FOREIGN PATENT DOCUMENTS

| | | |
|---|---|---|
| CN | 102446034 | 5/2012 |
| CN | 102981682 A | 3/2013 |
| TW | M318728 | 9/2007 |
| TW | 201214241 | 4/2012 |
| TW | 201214243 A1 | 4/2012 |
| TW | 201243793 | 11/2012 |
| TW | 201322183 A1 | 6/2013 |

* cited by examiner

IMAGE BRIGHTNESS ADJUSTING METHOD, OBJECT TRACKING METHOD AND OBJECT TRACKING APPARATUS

BACKGROUND OF THE INVENTION

1. Field of the Invention

The present invention relates to an image brightness adjusting method, an object tracking method and an object tracking apparatus, and particularly relates to an image brightness adjusting method, an object tracking method and an object tracking apparatus which compensate brightness of other pixels according to a difference between brightness information of at least one pixel and background brightness information.

2. Description of the Prior Art

Figure 1:
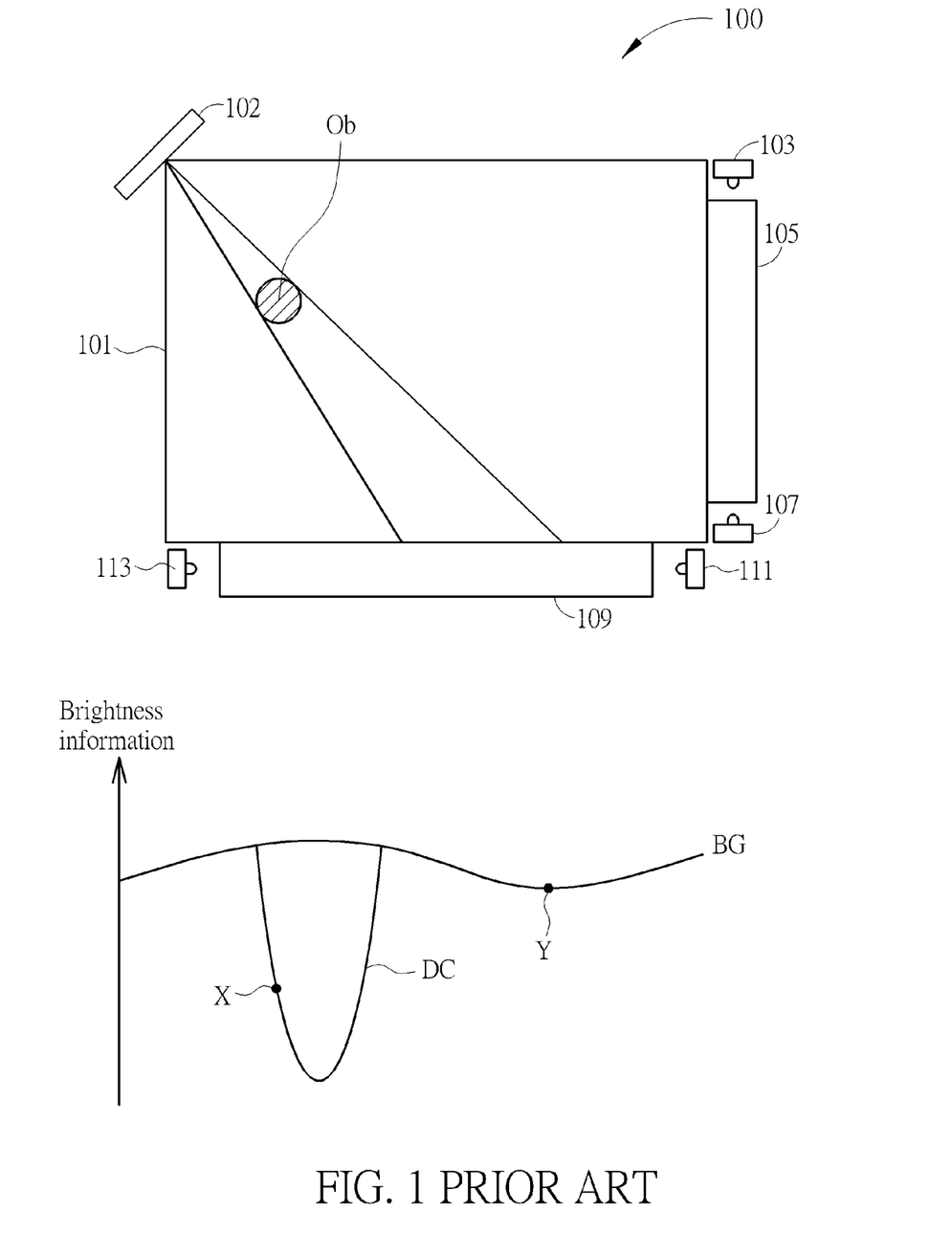
FIG. 1 is a schematic illustrating a situation that an object generates a dark region while utilizing a conventional object tracking apparatus.

FIG. 1 is a schematic illustrating a situation that an object generates a dark region while utilizing a conventional object tracking apparatus. As shown in FIG. 1, the object tracking apparatus 100 comprises a touch control panel 101, an image detecting apparatus 102, light guiding bars 105, 109 and light emitting diodes 103, 107, 111, 113. Light guiding bars 105, 109 are provided at two sides of the touch control panel 101. The light emitting diodes 103, 107, 111, 113 are respectively provided at ends of the light guiding bars 105, 109, to emit light to the touch control panel 101 via light guiding bars 105, 109. The image detecting apparatus 102 is provided opposite to the light guiding bars 105, 109. The image detecting apparatus 102 can detect a projected image of the object Ob (ex. a user's finger) if the object Ob moves on the touch control panel 101. Such projected image is a dark region generated by covering light from the light guiding bars 105, 109 with the object Ob. By this way, a location for the object Ob can be acquired. In FIG. 1, the dark region curve DC indicates a brightness information curve formed by the dark region (ex. an average brightness for a plurality of pixel images). The object tracking apparatus 100 can compute a location or a centroid of the object according to such dark region curve DC. Please note a value for each point of the dark region curve DC corresponds to at least one brightness value for each pixel line of an image from the object Ob, which is caught by the image detecting apparatus 102. For example, a sum or an average for brightness of a plurality of pixels can be applied as values for corresponding points of the dark region curve DC. Take the X point on the dark region curve DC in FIG. 1 for example, the brightness information for the X point can be a sum or an average for brightness of pixels in the X-th line image detecting apparatus 102. The background information curve BG indicates the background brightness information detected by the image detecting apparatus 102 (ex. an average of background brightness). The background information curve BG can be acquired via the steps of acquiring the dark region curve DC. Take the Y point on the background information curve BG in FIG. 1 for example, the brightness information for the Y point can be a sum or an average for brightness of pixels in the Y-th line of the image detecting apparatus 102.

Figure 2:
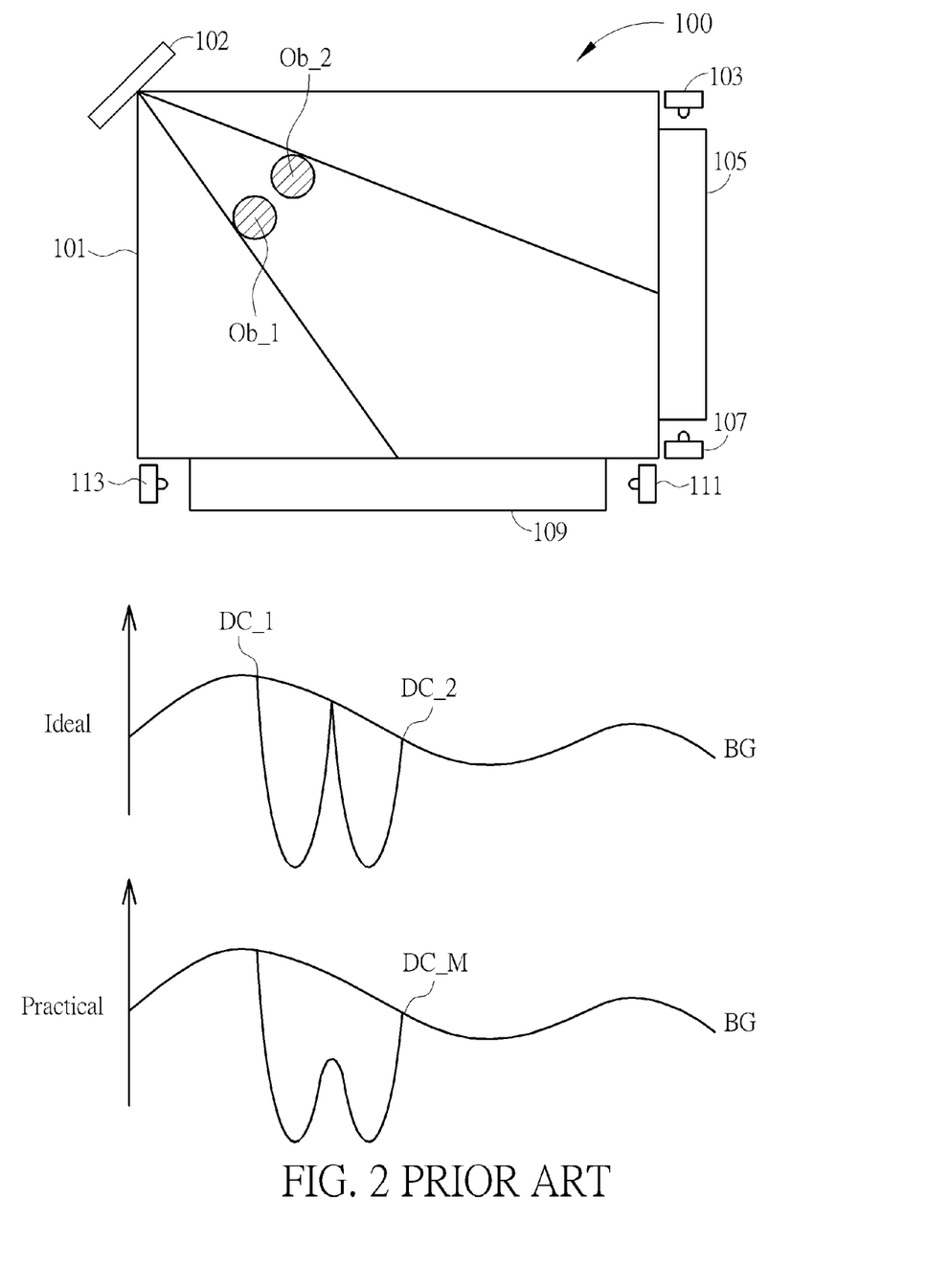
FIG. 2 is a schematic illustrating a situation that a plurality of objects generate a dark region while utilizing a conventional objects tracking apparatus.

FIG. 2 is a schematic illustrating a situation that a plurality of objects generate a dark region while utilizing a conventional objects tracking apparatus. As shown in FIG. 2, if two objects such as two fingers touch the touch control panel 101 simultaneously (or a distance between the objects and the touch control panel 101 is smaller than a predetermined value), two separate dark regions DC_1, DC_2 are supposed to be formed. Practically, however, if two objects are too close, adjacent pixels will affect each other, thus a mixed dark region curve DC_M as shown in FIG. 2 is generated. In such case, if the object tracking apparatus 100 directly computes locations or centroids for the objects Ob_1 and Ob_2 according to the mixed dark region curve DC_M, the locations or centroids may be wrongly computed, such that the accuracy for tracking the object will be affected.

SUMMARY OF THE INVENTION

Therefore, one object of the present invention is to provide an image brightness adjusting method, an object tracking method and an object tracking apparatus that can compensate a mixed dark region curve.

Another object of the present invention is to provide an image brightness adjusting method, an object tracking method and an object tracking apparatus that can compute an accurate location and an accurate centroid for an object, to perform a more accurate object tracking operation.

One embodiment of the present invention provides an image brightness information adjusting method, which comprises: computing background brightness information of an image; computing a first brightness information difference between brightness information for at least one pixel of a first image line of the image and background brightness information corresponding to the first image line; and adjusting brightness information for at least one pixel of a second image line according to the first brightness information difference.

Another embodiment of the present invention provides an object tracking method, applied to an object tracking apparatus comprising a touch control panel and an image detecting apparatus, wherein the image detecting apparatus generates an image comprising an object image generated by the object if at least one the object touches the touch control panel. The object tracking method comprises: computing background brightness information of an image; computing a first brightness information difference between brightness information for at least one pixel of a first image line of the image and background brightness information corresponding to the first image line; and adjusting brightness information for at least one pixel of a second image line according to the first brightness information difference to generate first adjusted information, wherein the first image line and the second image line both correspond to locations on which the objects touch the touch control panel; and computing a location or a centroid of the object according to the first adjusted information to track the object.

Still another embodiment of the present invention provides an object tracking apparatus, comprising: a touch control panel; an image detecting apparatus, for generating an image comprising an object image generated by the object if at least one the object touches the touch control panel; and a control unit, for computing a first brightness information difference between brightness information for at least one pixel of a first image line of the image and background brightness information corresponding to the first image line, for adjusting brightness information for at least one pixel of a second image line according to the first brightness information difference to generate first adjusted information, and for computing a location or a centroid of the object according the first adjusted information to track the object. The first image line and the second image line both correspond to locations on which the objects touch the touch control panel.

In view of above-mentioned embodiments, the mixed dark region curve can be adjusted to a dark region curve which is more similar with the original dark region curves for two objects. By this way, the location and the centroid of the object can be precisely computed, to perform a more accurate tracking operation.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
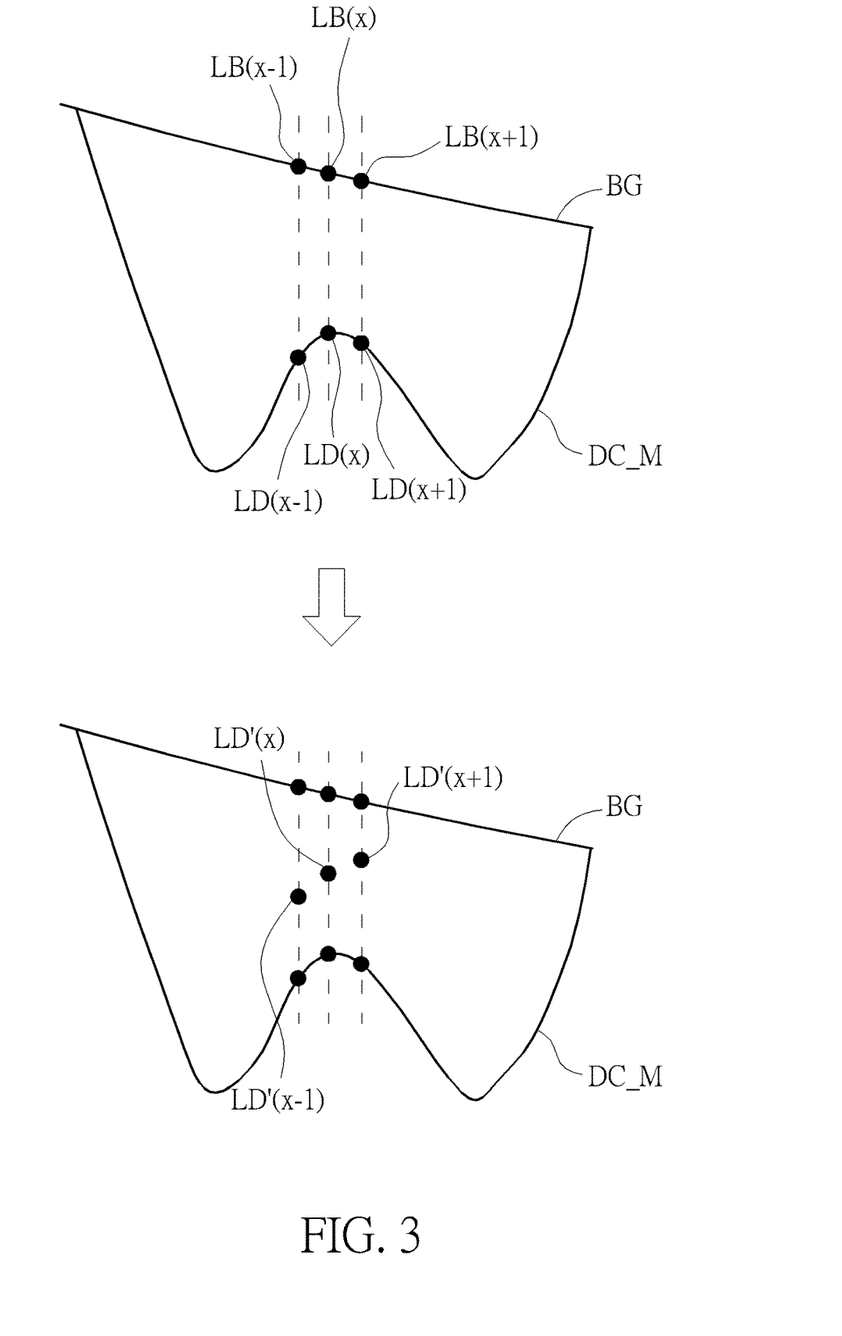
FIG. 3 is a schematic diagram illustrating an image brightness information adjusting method according to one embodiment of the present invention.

FIG. 3 is a schematic diagram illustrating an image brightness information adjusting method according to one embodiment of the present invention. Please note the average brightness is taken for an example for illustrating the following embodiments, but it does not mean the brightness information is limited to an average brightness. In FIG. 3, the BG means the background brightness information curve BG in FIG. 1 and FIG. 2, and DC_M means the mixed dark region curve DC_M in FIG. 2. LD(x−1), LD(x), LD(x+1) respectively means an average brightness for a pixel line of an image detecting apparatus (ex. the image detecting apparatus 102 in FIG. 1). For example, the LD(x−1) indicates an average brightness for a (x−1)-th pixel line of an image detecting apparatus, and the LD(x) indicates an average brightness for a x-th pixel line of an image detecting apparatus. Please note the average brightness here does not mean the average brightness for all pixels for a pixel line, it can mean the average brightness for part of the pixels for a pixel line. LB(x−1), LB(x), LB(x+1) respectively means an average brightness for the background brightness corresponding to a pixel line of an image detecting apparatus (ex. the image detecting apparatus 102 in FIG. 1). For example, the LB(x−1) indicates an average brightness for the background brightness corresponding to a (x−1)-th pixel line of an image detecting apparatus, and the LB(x) indicates an average brightness for the background brightness corresponding to a x-th pixel line of an image detecting apparatus. The above-mentioned pixel line can be a pixel row or a pixel column. A pixel row is taken for an example for explaining in the following embodiments. However, it does not mean the concept of the present invention is limited to a single pixel row or pixel rows. As above-mentioned, adjacent pixels will affect each other if the objects are too close.

Therefore, the present invention provides a mechanism that compensates an average brightness for a pixel row according to neighboring pixels rows. In one embodiment, the average brightness value for the x-th pixel row is applied for compensating while computing an average brightness for a (x−1) th pixel row, as shown in Equation (1):

$$LD[p]'=LD[p]+comp[p+1] \quad \text{Equation (1)}$$

LD[p]' means an average brightness for a compensated p-th pixel row, LD[p] means an average brightness for a p-th pixel row before compensation, comp[p+1] is a compensation parameter generated according to an average brightness of the (p+1) th pixel row. Therefore p=x−1 if an average brightness for a (x−1) th pixel row is desired to be acquired, thereby the Equation (1) becomes LD[x−1]'=LD[x−1]+comp[x].

In one embodiment, the adjusting coefficient can be generated by an adjusting function, as shown in Equation (2)

$$comp[q]=(LB[q]-LD[q])*\alpha \quad \text{Equation (2)}$$

LB[q] means an average background brightness corresponding to a q-th pixel row, and LD[q] is an average brightness for a q-th pixel row. Accordingly, LB[q]−LD[q] is an average brightness difference (can be other kinds of brightness information differences). α is an adjusting coefficient, which is ideally 1, is related to a modulation transfer function of the image sensing apparatus or the object tracking apparatus perform an image brightness information adjusting method provided by the present invention. Therefore, if the compensation parameter according to the average brightness of the x-th pixel is to be acquired, q=x, such that the Equation (2) changes to comp[x]=(LB[x]−LD[x])*α. Please note, the compensation parameter is not limited to above-mentioned Equation (2).

The modulation transfer function is for measuring an image quality. Take a lens system for example, if sinusoidal groove gratings with a max transparent ratio T_max and a min transparent ratio T_min are imaged, the image has a max brightness I_max and a min brightness I_min. Similar with a definition of the fringe visibility, the modulation for the grating and the image can be defined as: the modulation transfer function for the system is a ratio for the modulation of input and output. Commonly, the modulation transfer function is a function of space frequency, which located between 0-1. Also, the curve thereof is named a modulation transfer function curve. Such function is generally applied to estimate various kinds of optical devices, systems and environments. Moreover, such function can be applied to an object with a small size such as a lens, a magnetic tape or a negative, or an object with a big size such as a telescope, an eye or atmosphere. For a system, the modulation transfer function for a whole system is a product for the modulation transfer functions for each device in the system. In a geometric optics field, the modulation transfer function is sensitive to the image quality, thus it is always applied to determine ability for an image system. Persons skilled in the art can understand the definition for a modulation transfer function and the way to compute it, thus it is omitted for brevity here.

Each pixel row is not limited to be compensated by only a pixel row. Each pixel row can be compensated by a plurality of pixel rows. Take the abovementioned embodiments for example, the compensation method can be shown as Equation (3):

$$LD[p]'=LD[p]+comp[p+1]+comp[p+2] \quad \text{Equation (3)}$$

If LD[x−1]' is wished to be acquired by the Equation (3), p=x−1, such that LD[p]'=LD[x−1]+comp[x]+comp[x+1].

As above-mentioned, comp[x]=(LB[x]−LD[x])*α, and the compensation parameter of the (x+1)th row can be acquired via the Equation (2): comp[x+1]=(LB[x+1]−LD[x+1])*α.

Please note, the image brightness adjusting method according to the present invention is not limited to be adjusted via the compensation parameter generated by a pixel row or two pixel rows. For example, LD[x−1]' can equal to: LD[x−1]+comp[x]+comp[x+1]+comp[x+2]+comp[x+3] . . . .

Additionally, the compensation method provide by the present invention is not limited to generate compensation parameters according to neighboring pixels. The compensation parameter can be generated by a pixel row thereafter for N row. Thus the Equation (1) can be changed to Equation (4):

$$LD[p]'=LD[p]+comp[p+N] \qquad \text{Equation(4)}$$

N is a positive integer, Equation (4) equals to Equation (1) if N=1.

Following the same concept, the compensation parameter can be generated by a pixel row thereafter for M rows, which is after the pixel row thereafter for N rows. By this way, the Equation (3) can be changed to Equation (5):

$$LD[p]'=LD[p]+comp[p+N]+comp[p+N+M] \qquad \text{Equation(5)}$$

N and M are both positive integers, if N and M are both 1, Equation (3) equals to Equation (5).

In above-mentioned embodiments, the pixel row to be adjusted is adjusted according the a pixel row thereafter. However, the pixel row to be adjusted can be adjusted according a previous pixel row, according to the image brightness adjusting method provided by the present invention.

Therefore, the Equation (1) can be adjusted to the Equation (6):

$$LD[p]'=LD[p]+comp[p-1] \qquad \text{Equation (6)}$$

For example, if an (x+1)th pixel row is to be adjusted, LD[x+1]'=LD[x+1]+comp[x].

Also, the Equation (3) can be adjusted to the Equation (7):

$$LD[p]'=LD[p]+comp[p-1]+comp[p-2] \qquad \text{Equation (7)}$$

For example, if an (x+1)th pixel row is to be adjusted, LD[x+1]'=LD[x+1]+comp[x]+comp[x−1].

Similarly, Equations (4) and (5) can be adjusted to Equations (8) and (9)

$$LD[p]'=LD[p]+comp[p-N] \qquad \text{Equation(8)}$$

$$LD[p]'=LD[p]+comp[p-N]+comp[p-N-M] \qquad \text{Equation(9)}$$

If an adjusted average brightness is acquired via above-mentioned methods, the original average brightness can be updated to an adjusted average brightness. Take FIG. 3 for example, average brightness for the (x−1)th pixel row, the x-th pixel row, and the (x+1) the pixel row can be updated from LD(x−1), LD(x), LD(x+1) to LD'(x−1), LD'(x), LD'(x+1). In view of above-mentioned description, a mixed dark region curve DC_M is formed if two objects are too close such that neighboring pixels affect each other. Comparing the mixed dark region curve DC_M with the dark region curves DC_1, DC_2, in view of FIG. 2, the average brightness for the boundary of the dark region curves DC_1, DC_2 (i.e. the middle of the mixed dark region curve DC_M) is pulled down. The brightness at middle of the mixed dark region curve DC_M is pulled up, as shown in FIG. 3, thereby the issue that neighboring pixels affect each other if a plurality of objects are too close can be suppressed.

As above-mentioned, the average brightness can be replaced with other brightness information. For example, a sum for brightness of part pixels in a pixel row, such as summing brightness of three pixels having the first three brightness. In another example, the brightness information can be acquired via subtracting a sum for brightness of a second part of pixels from a sum of for brightness of a first part of pixels in the same pixel row. The first part of pixels, for example, can be pixels having the first three brightness. The second part of pixels, for example, can be pixels having the last three brightness. Additionally, the above-mentioned row can be replaced with a column. Furthermore, the above-mentioned method is not limited to two objects, the method can be applied if only one object exists.

Figure 4:
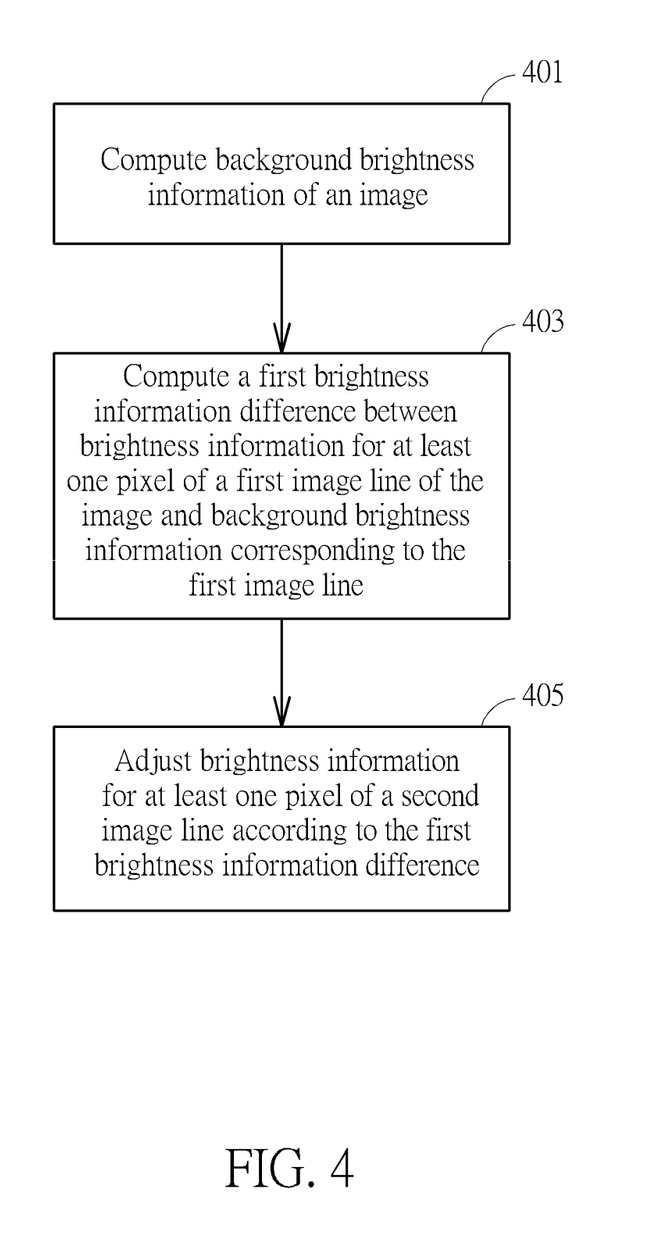
FIG. 4 is a flow chart illustrating an image brightness information adjusting method according to one embodiment of the present invention.

In view of above-mentioned embodiments, the image brightness information adjusting method according to the present invention can be summarized as FIG. 4, which comprises the following steps:

Step 401

Compute background brightness information of an image (ex. the average background brightness shown as the BG curve in FIG. 3).

Step 403

Compute a first brightness information difference between brightness information for at least one pixel of a first image line of the image and background brightness information corresponding to the first image line. Such as LB[q]−LD[q] shown in Equation (2).

Step 405

Adjust brightness information for at least one pixel of a second image line according to the first brightness information difference Other detail steps can be acquired in view of above-mentioned embodiments, thus it is omitted for brevity here.

Figure 5:
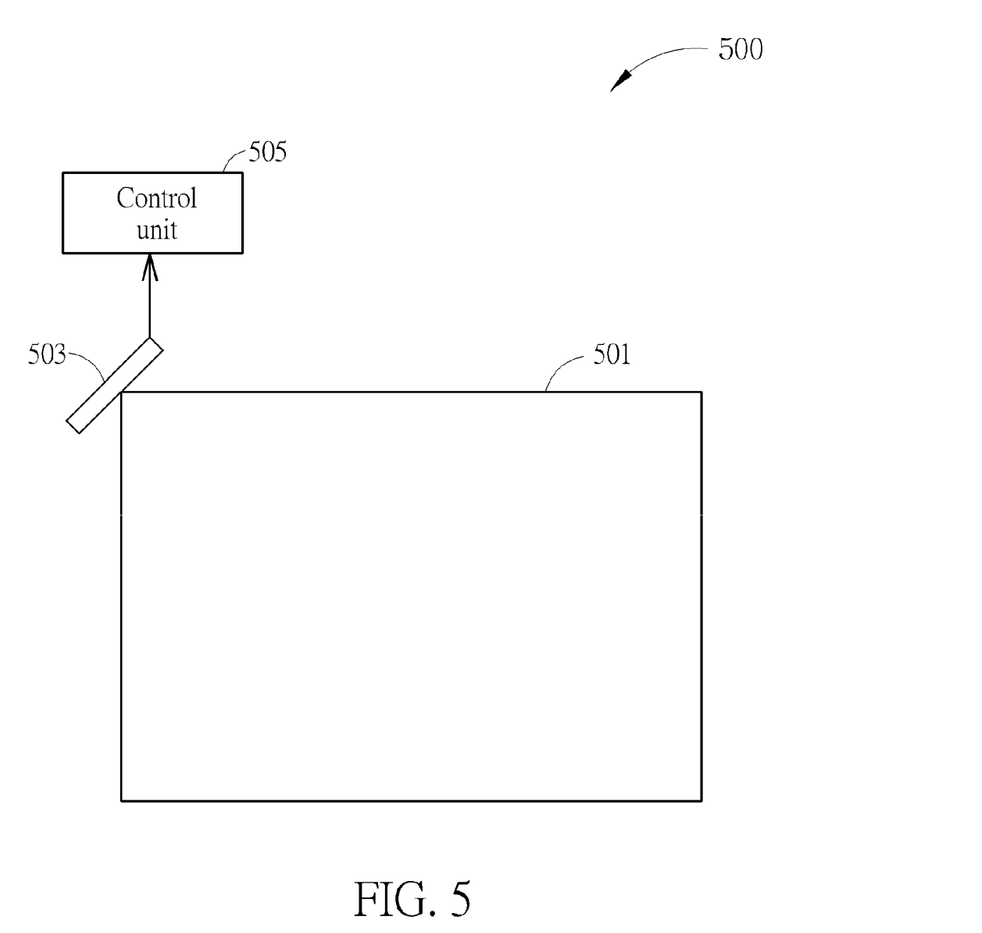
FIG. 5 is a schematic diagram illustrating an image brightness information adjusting apparatus performing an image brightness information adjusting method according to one embodiment of the present invention.

FIG. 5 is a schematic diagram illustrating an image brightness information adjusting apparatus performing an image brightness information adjusting method according to one embodiment of the present invention. As shown in FIG. 5, the object tracking apparatus 500 comprises a touch control panel 501, an image detecting apparatus 503 and a control unit 505. The image detecting apparatus 503 generates an image comprising an object image generated by the object if at least one the object touches the touch control panel. The control unit 505 computes a first brightness information difference (ex. LB[q]−LD[q] in Equation [2]) between brightness information for at least one pixel of a first image line of the image and background brightness information corresponding to the first image line. The above-mentioned first image line and the second image line illustrated below correspond to a location on which the object touches the touch control panel 501. For example, the first image line and the second image line are respectively (x−1)th pixel row and the x-th pixel row, which belong to the mixed dark region curve DC_M generate by the dark region curves DC_1, DC_2. Accordingly, the first image line and the second image line both correspond to the locations on which the object touches the touch control panel 501. The control unit 505 further adjusts brightness information for at least one pixel of the second image line according to the first brightness information difference to generate first adjusted information, and computes a location or a centroid of the object according the first adjusted information to track the object. Please note the light guiding bars 105, 109 and light emitting diodes 103, 107, 111 and 113 in FIG. 1 can be applied as light sources for the object tracking apparatus 500 in FIG. 5. However, other kinds of light sources can be applied to the object tracking apparatus 500 as well.

Other detail operations can be acquired according to above-mentioned embodiments, thus are omitted for brevity here.

Figure 6:
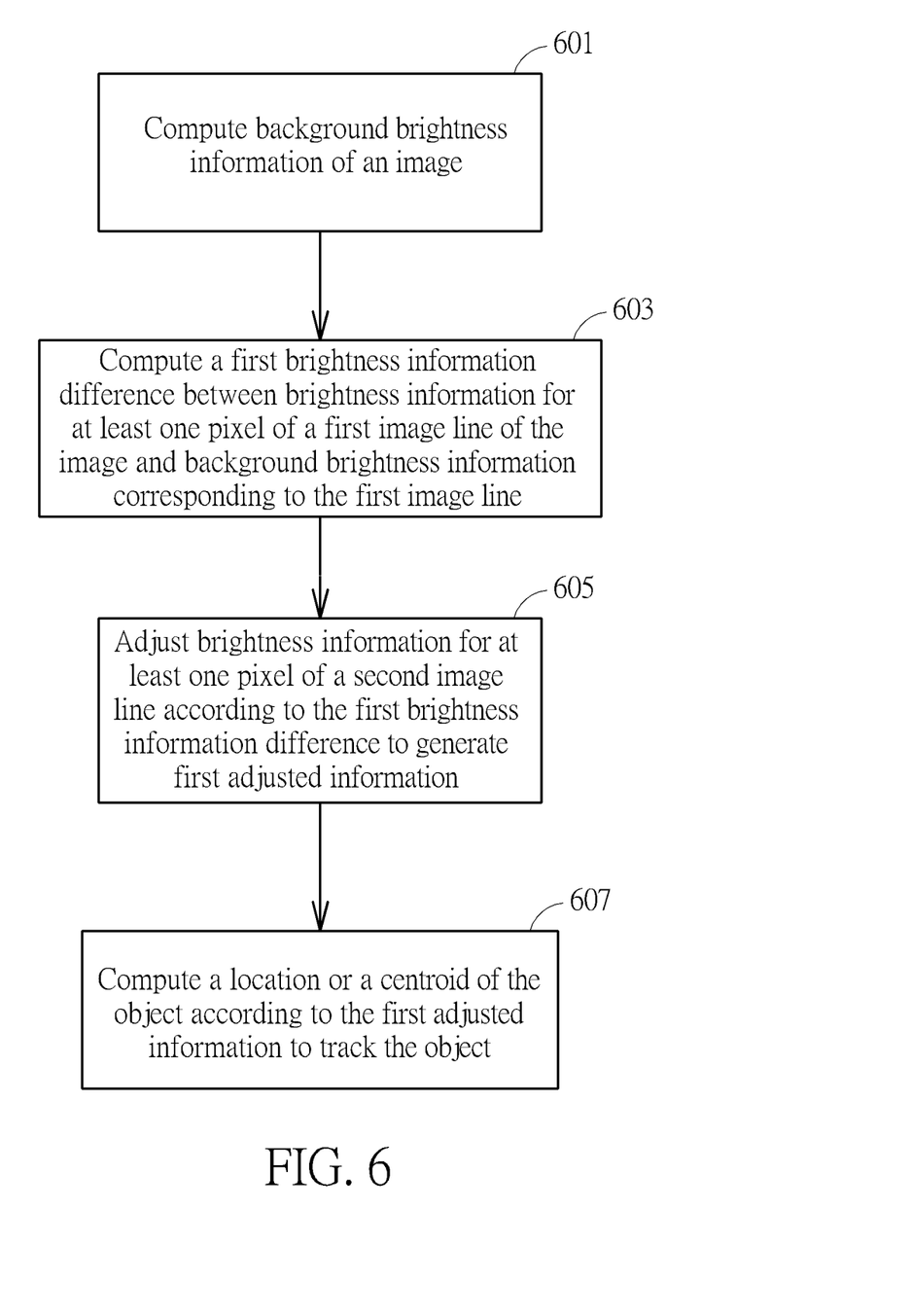
FIG. 6 is a flow chart illustrating an object tracking method according to one embodiment of the present invention.

In view of above-mentioned embodiments, the object tracking method show in FIG. 6 can be acquired, which comprises the following steps:

Step 601

Compute background brightness information of an image.

Step 603

Compute a first brightness information difference between brightness information for at least one pixel of a first image line of the image and background brightness information corresponding to the first image line. Such as LB[q]−LD[q] shown in Equation (2).

Step 605

Adjust brightness information for at least one pixel of a second image line according to the first brightness information difference to generate first adjusted information. The first image line and the second image line both correspond to locations on which the objects touch the touch control panel.

Step 607

Compute a location or a centroid of the object according to the first adjusted information to track the object.

Other detail steps can be acquired according to above-mentioned embodiments, thus are omitted for brevity here.

In view of above-mentioned embodiments, the mixed dark region curve can be adjusted to a dark region curve which is more similar with the original dark region curves for two objects. By this way, the location and the centroid of the object can be precisely computed, to perform a more accurate tracking operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image brightness information adjusting method, comprising:
    acquiring background brightness information for a first image, wherein the first image comprises no object image and is captured by an image detecting apparatus computing background brightness information of;
    employing the image detecting apparatus to capture a second image comprising a plurality of image lines having current brightness information, wherein the second image comprises an object image region corresponding to at least two objects, wherein the current brightness information of the object image region forms a dark region curve having a peak region between two crest regions which is not the background brightness information;
    computing a first brightness information difference between the current brightness information for at least one pixel of a first image line of the second image and the background brightness information of for the image line corresponding to the first image line; and
    adjusting the current brightness information for at least one pixel of a second image line of the second image according to the first brightness information difference; wherein the second image line is in the peak region.

2. The image brightness information adjusting method of claim 1, wherein the first image line is after the second image line.

3. The image brightness information adjusting method of claim 2, further comprising:
    computing a second brightness information difference between the current brightness information for at least one pixel of a third image line of the second image and the background brightness information of corresponding to the third image line, wherein the third image line is after the first image line; and
    adjusting the current brightness information for at least one pixel of the second image line according to the first brightness information difference and the second brightness information difference.

4. The image brightness information adjusting method of claim 3, further comprising:
    adjusting the current brightness information for at least one pixel of the first image line according to the second brightness information difference.

5. The image brightness information adjusting method of claim 1, wherein the first image line is prior to the second image line.

6. The image brightness information adjusting method of claim 5, further comprising:
    computing a second brightness information difference between the current brightness information for at least one pixel of a third image line of the second image and the background brightness information of corresponding to the third image line, wherein the third image line is prior to the first image line; and
    adjusting the current brightness information for at least one pixel of the second image line according to the first brightness information difference and the second brightness information difference.

7. The image brightness information adjusting method of claim 6, further comprising:
    adjusting the current brightness information for at least one pixel of the first image line according to the second brightness information difference.

8. The image brightness information adjusting method of claim 1, applied to an image detecting apparatus, wherein the step of adjusting the current brightness information for at least one pixel of a second image line according to the first brightness information difference comprises:
    generating an adjusting function via multiplying the first brightness information difference with an adjusting coefficient; and
    adjusting the current brightness information for at least one pixel of the second image line according to the adjusting function;
    wherein the adjusting coefficient is related to a modulation transfer function of the image detecting sensing apparatus.

9. The image brightness information adjusting method of claim 1,
    wherein the background brightness information is a background brightness;
    wherein the current brightness information for at least one pixel of the first image line is an average brightness for at least one pixel of the first image line;
    wherein the first brightness information difference is brightness difference between the background brightness and the average brightness for at least one pixel of the first image line; and
    wherein the current brightness information for at least one pixel of the second image line is an average brightness for at least one pixel of the second image line.

10. An object tracking method, applied to an object tracking apparatus comprising an object detecting apparatus to generate an object image corresponding to at least two objects and including a plurality of image lines, wherein the object tracking method comprises:
- obtaining background brightness information for a first image, wherein the first image comprises no object image and is captured by the object detecting apparatus storing a background brightness information containing a plurality of background brightness values;
- obtaining a first current brightness information for a kth image line of the object image and a second current brightness information for a k+1th image line of the object image;
- computing a first brightness information difference between the first current brightness information and a kth background brightness value of the background brightness information;
- adjusting the second current brightness information according to the first brightness information difference to generate first adjusted brightness information; and
- computing locations of the objects according to the first adjusted brightness information to track the objects;
- wherein the current brightness information of the object image forms a dark region curve having a peak region between two crest regions;
- wherein the k+1 image line is in the peak region.

11. The object tracking method of claim 10, wherein the kth image line is after the k+1th image line.

12. The object tracking method of claim 11, further comprising:
- computing a second brightness information difference between current brightness information for at least one pixel of a k−1th image line of the object image and background brightness information corresponding to the k−1th image line, wherein the k−1th image line is after the kth image line;
- generating the first adjusted brightness information according to the first brightness information difference and the second brightness information difference; and
- computing the locations of the objects according to the first adjusted brightness information.

13. The object tracking method of claim 12, further comprising:
- adjusting the current brightness information for at least one pixel of the kth image line according to the second brightness information difference to generate a second adjusted brightness information; and
- computing the locations of the objects according to the first adjusted brightness information and the second adjusted brightness information.

14. The object tracking method of claim 10, wherein the kth image line is prior to the k+1th image line.

15. The object tracking method of claim 14, further comprising:
- computing a second brightness information difference between the current brightness information for at least one pixel of a k−1th image line of the object image and background brightness information corresponding to the k−1th image line, wherein the k−1th image line is prior to the kth image line; and
- generating the first adjusted brightness information according to the first brightness information difference and the second brightness information difference; and
- computing the locations of the objects according to the first adjusted brightness information.

16. The object tracking method of claim 15, further comprising:
- adjusting the current brightness information for at least one pixel of the kth image line according to the second brightness information difference to generate a second adjusted brightness information; and
- computing the locations of the objects according to the first adjusted brightness information and the second adjusted brightness information.

17. The object tracking method of claim 10, wherein the step of adjusting current brightness information for at least one pixel of a k+1th image line according to the first brightness information difference comprises:
- generating an adjusting function via multiplying the first brightness information difference by an adjusting coefficient; and
- adjusting the current brightness information for at least one pixel of the k+1th image line according to the adjusting function;
- wherein the adjusting coefficient is related to a modulation transfer function of the object detecting image sensing apparatus.

18. The object tracking method of claim 10,
- wherein the background brightness information is a background brightness;
- wherein the current brightness information for at least one pixel of the kth image line is an average brightness for at least one pixel of the kth image line;
- wherein the first brightness information difference is brightness difference between the background brightness and the average brightness for at least one pixel of the kth image line; and
- wherein the current brightness information for at least one pixel of the k+1th image line is an average brightness for at least one pixel of the k+1th image line.

19. The object tracking method of claim 10, wherein a number of the objects is at least two, wherein the step of computing locations of the objects according to the first adjusted information to track the objects computes the locations of the objects according to the first adjusted information.

20. An object tracking apparatus, comprising:
- an object detecting apparatus, for generating an object image corresponding to at least two objects and including a plurality of image lines; and
- a control unit, for obtaining background brightness information for a first image, wherein the first image comprises no object image and is captured by the object detecting apparatus, for obtaining a first current brightness information for a kth image line of the object image and a second current brightness information for a k+1th image line of the object image, for computing a first brightness information difference between the first current brightness information and a kth background brightness value of the background brightness information, for adjusting the second current brightness information according to the first brightness information difference to generate first adjusted brightness information, and for computing locations of the objects according to the first adjusted brightness information to track the objects;
- wherein the current brightness information of the object image forms a dark region curve having a peak region between two crest regions;
- wherein the k+1 image line is in the peak region, for computing a first brightness information difference between the first brightness information and a kth background brightness value of background brightness information, for adjusting the second brightness information according to the first brightness information difference to generate first adjusted information, and for computing a location of the object according to the first adjusted information to track the object.

21. The object tracking apparatus of claim 20, wherein the kth image line is after the k+1th image line.

22. The object tracking apparatus of claim 21, wherein the control unit further performs following steps:
   computing a second brightness information difference between current brightness information for at least one pixel of a k−1th image line of the object image and background brightness information corresponding to the k−1th image line, wherein the k−1th image line is after the kth image line;
   generating the first adjusted brightness information according to the first brightness information difference and the second brightness information difference; and
   computing the locations of the objects according to the first adjusted brightness information.

23. The object tracking apparatus of claim 22, further comprising:
   adjusting the current brightness information for at least one pixel of the kth image line according to the second brightness information difference to generate a second adjusted brightness information; and
   computing the locations of the objects according to the first adjusted brightness information and the second adjusted brightness information.

24. The object tracking apparatus of claim 20, wherein the kth image line is prior to the k+1th image line.

25. The object tracking apparatus of claim 24, wherein the control unit further performs following steps:
   computing a second brightness information difference between the current brightness information for at least one pixel of a k−1th image line of the object image and background brightness information corresponding to the k−1th image line, wherein the k−1th image line is prior to the kth image line;
   generating the first adjusted brightness information according to the first brightness information difference and the second brightness information difference; and
   computing the locations of the objects according to the first adjusted brightness information.

26. The object tracking apparatus of claim 25, wherein the control unit adjusts the current brightness information for at least one pixel of the kth image line according to the second brightness information difference to generate a second adjusted brightness information, and computes the locations of the objects according to the first adjusted brightness information and the second adjusted brightness information.

27. The object tracking apparatus of claim 20, wherein the control unit adjusts current brightness information for at least one pixel of a k+1th image line via following steps:
   generating an adjusting function via multiplying the first brightness information difference by an adjusting coefficient; and
   adjusting the current brightness information for at least one pixel of the k+1th image line according to the adjusting function;
   wherein the adjusting coefficient is related to a modulation transfer function of the object detecting image sensing apparatus.

28. The object tracking apparatus of claim 20,
   wherein the background brightness information is a background brightness;
   wherein the current brightness information for at least one pixel of the kth image line is an average brightness for at least one pixel of the kth image line;
   wherein the first brightness information difference is brightness difference between the background brightness and the average brightness for at least one pixel of the kth image line; and
   wherein the current brightness information for at least one pixel of the k+1th image line is an average brightness for at least one pixel of the k+1th image line.

29. The object tracking apparatus of claim 20, wherein a number of the objects is at least two, wherein control unit computes the locations of the objects according the first adjusted information.

30. The object tracking method of claim 10, wherein the object detecting apparatus is an image detecting apparatus.

31. The object tracking method of claim 10, wherein the first current brightness information is brightness for at least one pixel for the kth image line.

32. The object tracking method of claim 10,
   wherein the object tracking apparatus comprises a touch control panel;
   wherein the kth image line and the k+1th image line both correspond to locations on which the objects touch the touch control panel.

33. The object tracking apparatus of claim 20, wherein the object detecting apparatus is an image detecting apparatus.

34. The object tracking apparatus of claim 20, wherein the first brightness information is brightness for at least one pixel for the kth image line.

35. The object tracking method of claim 20,
   wherein the object tracking apparatus comprises a touch control panel;
   wherein the kth image line and the k+1th image line both correspond to locations on which the objects touch the touch control panel.

* * * * *